United States Patent [19]

Murgue et al.

[11] Patent Number: 4,773,017
[45] Date of Patent: Sep. 20, 1988

[54] METHOD AND DEVICE FOR ASSISTING HEIGHT HOLDING IN AIR NAVIGATION

[75] Inventors: Jean P. Murgue, Sevres; Robert Pressiat, Ville D'Avray; Léon Robin, Massy, all of France

[73] Assignee: Thomson-CSF, Paris, France

[21] Appl. No.: 888,378

[22] Filed: Jul. 23, 1986

[30] Foreign Application Priority Data

Jul. 26, 1985 [FR] France ................... 85 11500

[51] Int. Cl.⁴ ................ G06F 15/50; G05D 1/06
[52] U.S. Cl. ................... 364/433; 364/458; 244/180
[58] Field of Search ........... 364/458, 424, 433, 434; 342/182, 64, 63, 66; 244/180, 175

[56] References Cited

U.S. PATENT DOCUMENTS

| | | | |
|---|---|---|---|
| 3,076,095 | 1/1963 | Becklund | 250/203 R |
| 4,490,719 | 12/1984 | Botwin et al. | 342/64 |
| 4,514,733 | 4/1985 | Schmidtlein et al. | 342/64 |
| 4,527,161 | 7/1985 | Wehner | 342/180 |

OTHER PUBLICATIONS

Merchant, "Exact Area Registration of Different Views of a Common Object Scene", 5/81, Optical Engineering, vol. 20, No. 3, pp. 424-434.

Primary Examiner—Parshotam S. Lall
Assistant Examiner—Thomas G. Black
Attorney, Agent, or Firm—Oblon, Fisher, Spivak, McClelland & Maier

[57] ABSTRACT

A method and device are provided for assisting in height holding in air navigation, consisting, for any point (M) of the image of the landscape flown over by the aircraft (A), located by its angle of elevation ($\theta-p$) with respect to the speed vector V of the aircraft, and situated in a zone between a lower elevational limit ($\theta_1-p$) and an upper elevational limit ($\theta_2-p$), in the trajectory of the aircraft, in detecting a possible deviation between the angular speed $\Omega$ of movement of this point with respect to the aircraft, depending on the height (h,H) of subsequent crossing of this point by the aircraft, for identical piloting conditions, and an angular reference speed of movement ($\Omega_o$) corresponding to a reference height ($h_o,H_o$) of subsequent crossing by the aircraft of a point having the same elevation ($\theta-p$), for identical piloting conditions, and in modifying the piloting of the aircraft, should a deviation between these angular speeds of movement be detected, so as to reduce these deviations.

12 Claims, 5 Drawing Sheets

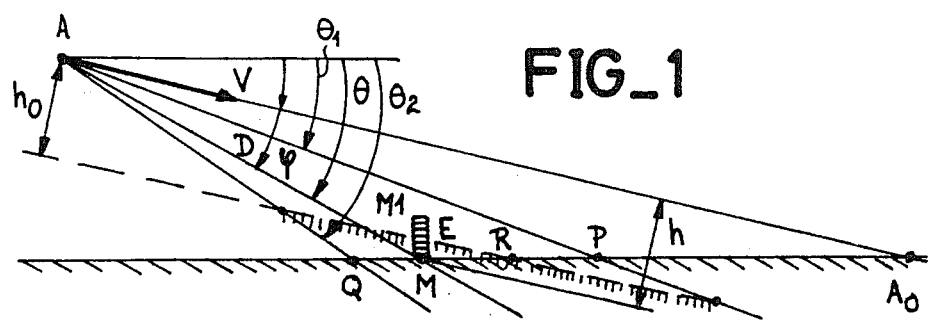
FIG_1
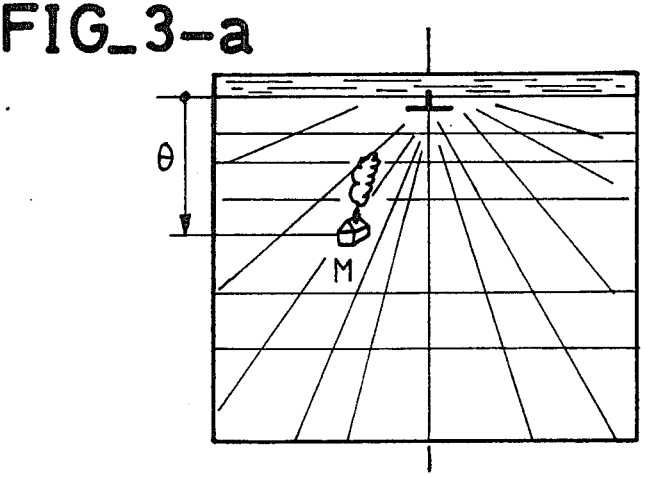
FIG_3-a
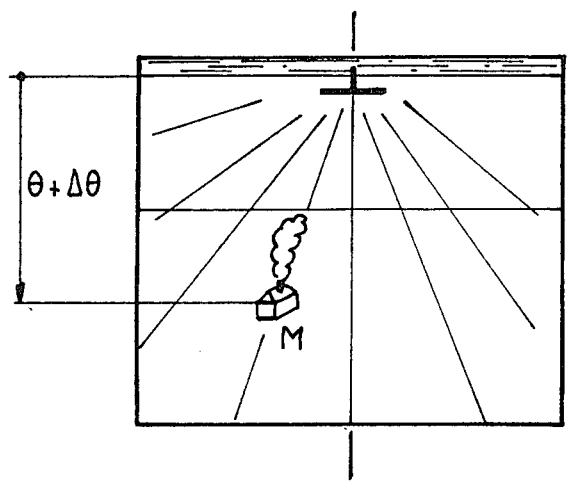
FIG_3-b

FIG_2-a
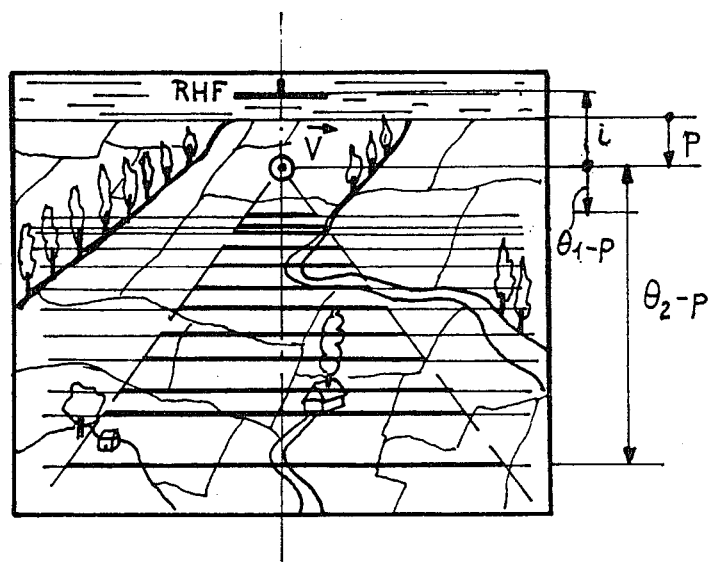
FIG_2-b
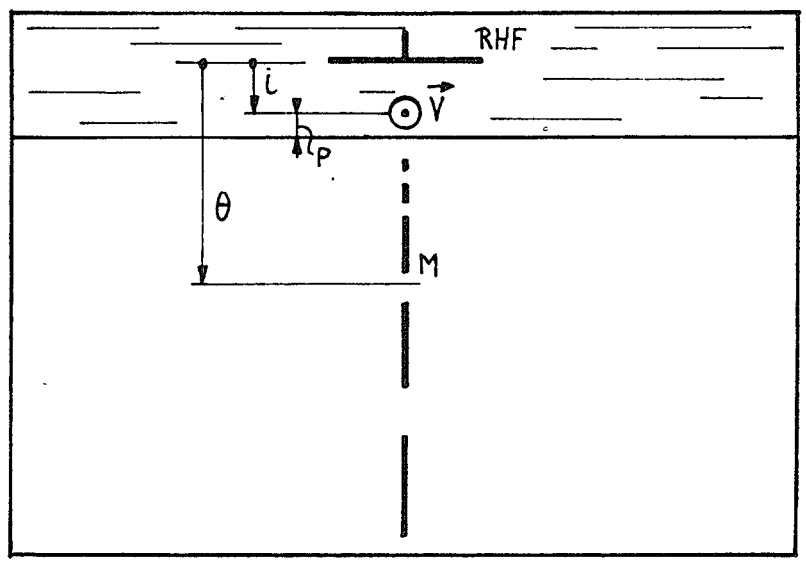

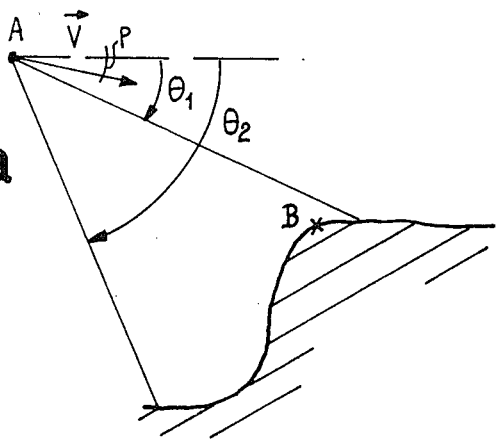
FIG_4-a
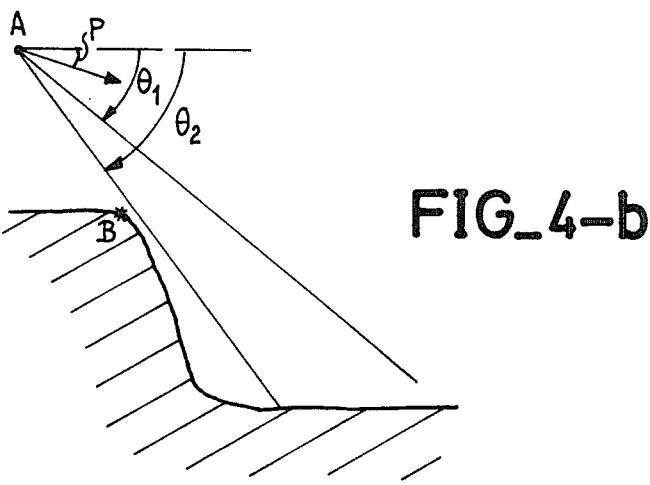
FIG_4-b
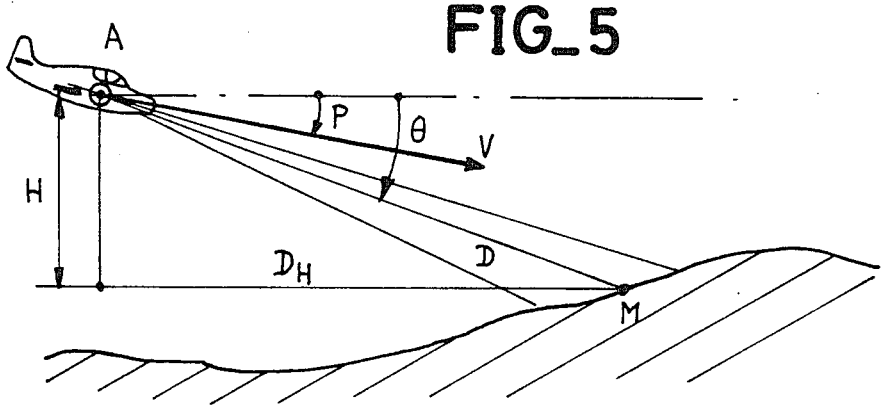
FIG_5

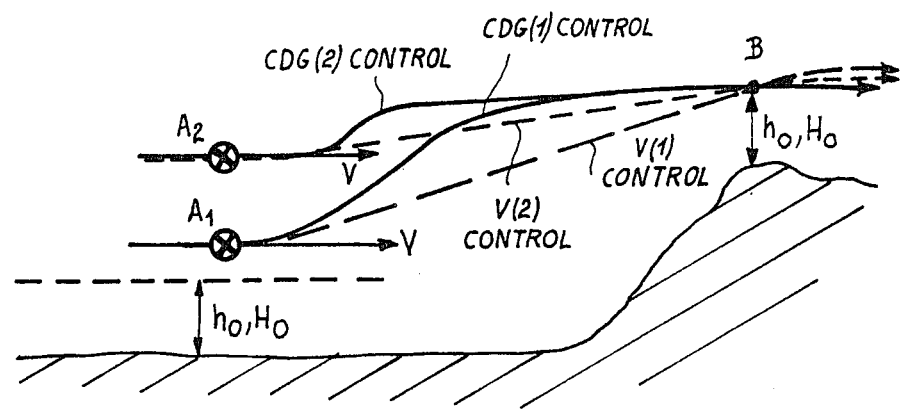
FIG_6
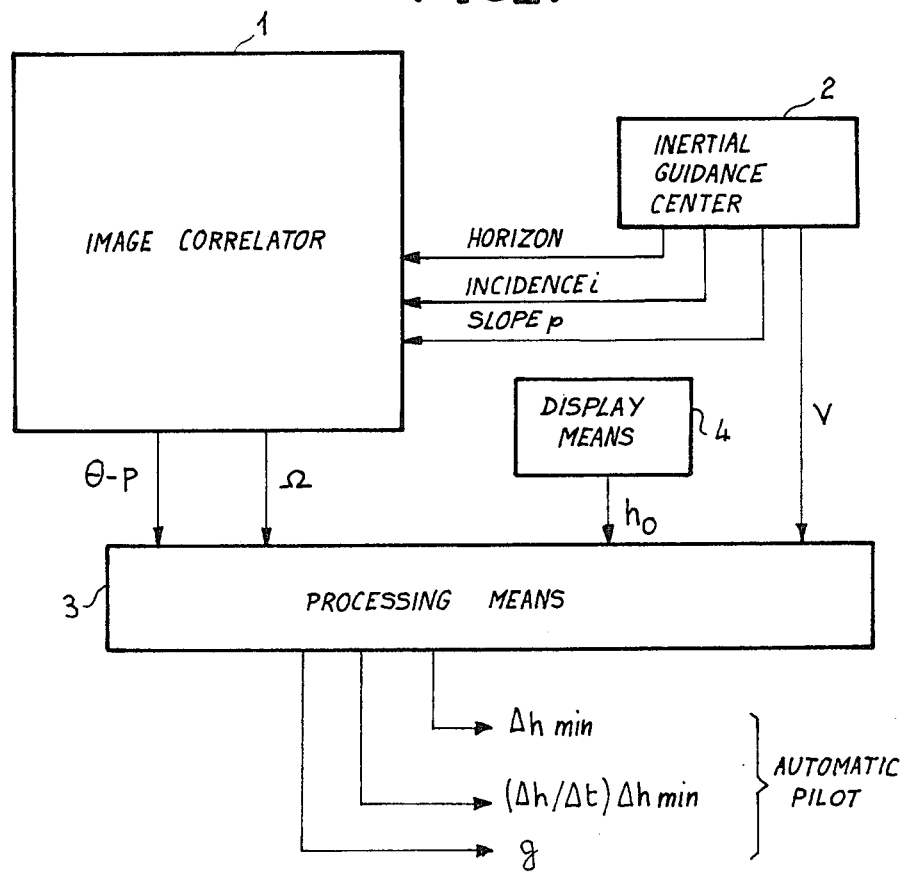
FIG_7

FIG_8
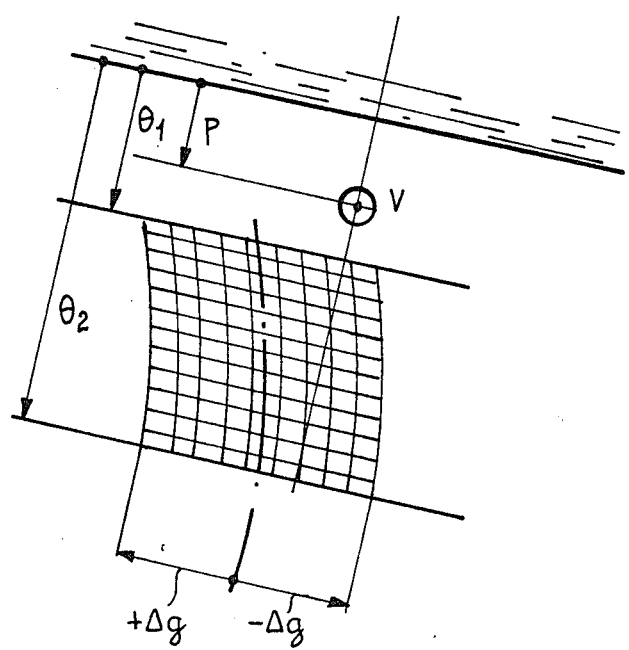

METHOD AND DEVICE FOR ASSISTING HEIGHT HOLDING IN AIR NAVIGATION

BACKGROUND OF THE INVENTION

The present invention relates to a method and device for assisting the holding of height in air navigation.

In very low altitude navigation of aircrafts, particularly military aircraft, the work load of the pilots is considerable. The pilots of fighter aircraft must thus, while flying as close as possible to ground (so as to avoid being detected by monitoring and firing means) carry out tasks of navigating on located points, acquisition of objectives, alert, counter measures, self defense, observation, etc.

SUMMARY OF THE INVENTION

The purpose of the present invention is to allow a predetermined height to be held without any direct active measurement of the oblique or vertical distance, and even if the relief is not known previously.

For this, the invention uses the perspective image of the outside landscape in front of the aircraft, obtained either by direct vision, or by means of a sensor or otherwise (synthetic relief, for example).

Height holding may be achieved in accordance with the invention either by the pilot, through the use of an adequate figure superimposed in this image, or by an automatic pilot through an adequate control device.

The present invention provides a method of assisting height holding in air navigation, consisting essentially, for every point of the image of the landscape flown over by the aircraft, located by its angle of elevation ($\theta - p$) with respect to the speed vector of the aircraft and situated in a zone between a lower elevation limit and an upper elevation limit, in the path of the aircraft, in detecting a possible difference between the angular speed of travel of this point with respect to the aircraft, depending on the height (h, H) at which this point is subsequently crossed by the aircraft, for identical piloting conditions, and an angular reference travel speed, corresponding to a reference height ($h_o$, $H_o$) at which the aircraft subsequently crosses a point of the same elevation ($\theta - p$), with identical piloting conditions, and in modifying the piloting of the aircraft, should a difference between these angular travel speeds be detected, so as to reduce these differences.

BRIEF DESCRIPTION OF THE DRAWINGS

Other objects and features of the present invention will appear clearly from reading the following description of embodiments, made with reference to the accompanying drawings in which:

FIG. 1 is a diagram showing the principle of the invention and defining the parameters used in the case where the height at which the aircraft crosses the different points of the particular zone considered on the ground is measured with reference with the direction of the speed vector of the aircraft;

FIGS. 2a and 2b illustrate two examples of height holding through the use by the pilot of an adequate figure superimposed in the image;

FIGS. 3a and 3b show examples of the image of the zone considered on the ground, obtained respectively at successive times at $t + \Delta t$;

FIGS. 4a and 4b illustrate by means of examples the choice of the limit, lower and upper values of the elevational field defining the zone considered on the ground.

FIG. 5 is a diagram showing the principle of the invention and defining the parameters used in the case where the height at which the aircraft crosses the different points of the particular zone considered on the ground is measured with reference to a horizontal passing through the center of gravity of the aircraft;

FIG. 6 shows comparatively different examples of aircraft trajectories for a given configuration of the particular zone considered on the ground, depending on whether piloting of the aircraft is controlled by action on the slope of its speed vector or by action on the height of its center of gravity with respect to the ground;

FIG. 7 is a diagram of one embodiment of a piloting control device when the height holding is carried out by automatic pilot; and FIG. 8 shows the image zone treated by correlation in the case of FIG. 7.

DESCRIPTION OF THE PREFERRED EMBODIMENT

FIG. 1 will be considered in which an aircraft is represented by the point A and its absolute speed vector by the vector $\overline{V}$. The apparent movement of a fixed point M on the ground is expressed by the relationship:

$$\Omega = V/D \, \text{sine} \, (\theta - p)$$

and, since $$D = \frac{h}{\text{sine} \, (\theta - p)}$$

the relationship becomes:

$$\Omega = V/h \, \text{sine}^2 \, (\theta - p) \qquad (1)$$

or else $$h = V/\Omega \, \text{sine}^2 \, (\theta - p) \qquad (2)$$

If V, $\theta$, p are known, by measuring $\Omega$ the minimum distance h may be determined at which the aircraft will pass above point M of the relief (if $\overline{V}$ remains unchanged).

Furthermore, if $h_o$ is the desired value h (reference value) and $\Omega_o$ (for a given angle $\theta - p$) the associated angular value, we have: (for h and $h_o \neq o$)

$$\frac{\Delta h = h - h_o}{h_o} = \frac{-\Delta\Omega = \Omega_o - \Omega}{\Omega}$$

The invention is based on these relationships:
Two methods of application are envisaged:
assistance to piloted following of the ground
automatic following of the ground.

In the case of assistance to piloted ground tracking, there are presented to the pilot, as shown in FIG. 2a, on the one hand, the image of the ground and on the other a moving scale driven at moving speeds defined by the relationship:

$$\Omega_o = V/h_o \, \text{sine}^2 \, (\theta - p) \qquad (4)$$

This scale is presented for elevations, with respect to the speed vector $\vec{V}$, between $\theta_2-p$ and $\theta_1-p$ (the angles $\theta_1$ and $\theta_2$ being chosen depending on the considerations which will be set forth further on).

By comparison, for each angle $\theta-p$ in the above defined field, between the moving speeds $\Omega$ of the points of the landscape and the moving speeds $\Omega_o$ of the reference scale, the pilot may know ($C_f$ relationship (3)) whether he will pass too close to or too far from each of these points.

For example, looking again at FIG. 1, it can be seen that the points on the ground from R to P (R excepted) move more quickly than the reference (the aircraft will pass too close to them) and conversely for points R to Q (R excepted). Point R has normal travel. As for a tower of the type $MM_1$, it can be seen that it moves more slowly than the reference at its foot M, more quickly at its top $M_1$.

The moving reference scale, may, for increasing the realism, be shown as a perspective view, that is to say the gaps between the bars and possibly the lengths of the bars will be proportional to sine $(\theta-p)$. It is also possible, for example, as shown in FIG. 2b, to imagine a "cascade" presentation of vertical dashes, the length of each and their spacing varying as their vertical speed proportional to:

$$V/H \sin^2 (\theta-p)$$

In FIGS. 2a and 2b, angle i designates the angle of incidence of the aircraft, that is to say the angle between the longitudinal axis of the aircraft, or horizontal fuselage reference (shortened to HFR) of the aircraft and the direction of the speed vector.

In the case of automatic ground tracking, by correlating homologous portions of the image obtained successively in time, the moving speed $\Omega$ is obtained for each of the points of the image, with respect to $\Delta\theta/\Delta t$ where $\Delta\theta$ represents the elevational shift of each point of the landscape between times t and $t+\Delta t$.

The value $\Delta\theta$ is brought out in FIGS. 3a and 3b showing respectively the position of the same element of the landscape on the images obtained at two successive times t and $t+\Delta t$.

Thus for eachh of the points of the image we have:

$$\Delta h = h - h_o = V/\Omega \sin^2 (\theta-p) - h_o \quad (5)$$

This calculation is made for a device such as the one described subsequently in connection with FIG. 7.

The value $\Delta h$ may be used directly as input to the automatic pilot for the "vertical" piloting of the aircraft (associated with the usual information from the inertial center of the aircraft).

More precisely, the smallest of the values $\Delta h$ obtained for the whole of the points situated in the path of the aircraft and with elevations between $\theta_1$ and $\theta_2$, called $\Delta h_{min}$, must be equal to 0. It is then the value $\Delta h_{min}$ which will pilot the required evolutions.

The reasons governing the choice of the uupper and lower limits of the elevational field: $\theta_1$ and $\theta_2$ will now be explained with reference to FIGS. 4a and 4b.

In FIG. 4a, an aircraft A has been shown approaching a hill. In this case, if the upper limit $\theta_1$ is relatively low (as is the case in this Figure) the top B of the hill will be taken into account relatively early in determining the future trajectory of the aircraft, which will result in passing above the valley at a height greater than the reference value $h_o$. In such a case it is therefore advantageous to choose a higher value of $\theta_1$.

More generally, the upper limit $(\theta-p)_1$ is chosen, so as to allow the necessary pull up to be effected for crossing an obstacle with the clearance height $h_o$, and with a normal vertical manoeuver load factor N in low altitude flight (for example $\pm 0.5$) and crossing the obstacle in a slope reduced to 0 again, which gives:

$$\tfrac{1}{2}h_o = \tfrac{1}{2}(N-1)g(D/2V)^2$$

and total $$D = 2V\left[\tau + \sqrt{\frac{h_o}{(N-1)g}}\right]$$

where $\tau$ is the reaction time for varying the load factor, whence:

$$tg\ (\theta-p)_1 = \frac{h_o}{D\ \text{total}}$$

For example with h=100 m, $\tau$=1s, V=300 m/s, N=0.5, D=3 300 m and $(\theta-p)_1=1°.7$ (30 mrad).

Conversely, in FIG. 4b, an aircraft A has been shown moving away from a hill. In this case, if the lower limit $\theta_2$ is relatively low, which is the case in this Figure, the top B of the hill will now be taken into account in determining the future trajectory of the aircraft, which may lead to not respecting the reference height $h_o$ when passing above point B. In such a case a higher value $\theta_2$ should be chosen. The lower limit $(\theta-p)_2$ is therefore chosen:

(1°) So as to avoid premature return to hand control for example when approaching peaks, and (2°) So as to go as far as elevations where the sensitivity of perception of the moving speed differences is sufficient.

In accordance with the same criterion, for example, in counter pull-up with an evolution load factor of 0.5 and a 0 reaction time, the clearance height $h_o$ above the obstacle being reduced by h/10, we find: D=600 m and $(\theta-p)_2 = 9°.5$ (166 mrad).

This limit $(\theta-p)_2$ may also be fixed by the field available in elevation in the display through which or in which the ground to be flown over is observed.

In the case of FIG. 5, instead of considering the distance h of vector $\vec{V}$ passing above the points of the passage ($\vec{V}$ being of unvarying direction) we consider the height H of the aircraft with respect to these landscape elements.

It will then be desirable to pilot $H-H_o$ (where $H_o$ is the desired or reference height) instead of piloting $h-h_o$, that is to say that instead of piloting according to the direction of the speed vector, piloting will be carried out according to the height of the center of gravity of the aircraft.

In this case, we will have: $\Omega = V/D \sin (\theta-p)$ and, since $$D = \frac{H}{\sin \theta}$$

$$\Omega = V/D \sin \theta \sin (\theta-p) \quad (6)$$

and $$H = V/\Omega \sin \theta \sin (\theta-p) \quad (7)$$

As before, by defining a reference height $H_o$ and the associated angular speeds $\Omega_o$, we obtain the relationship:

$$\frac{\Delta H = H - H_o}{H_o} = \frac{\Delta \Omega = \Omega_o - \Omega}{\Omega} \quad (8)$$

The above considerations apply then in the same way to this variant, except that sine $\theta$ sine $(\theta - p)$ is used instead of $sine^2 (\theta - p)$ in calculating the values $\Omega$, H, $\Omega_o$, $H_o$.

The advantage of this variant resides in the fact that the imposed trajectory is practically independent of the difference, at a given time, with the desired trajectory. For example, in FIG. 6, the trajectories of aircrafts $A_1$ and $A_2$ join up rapidly with center of gravity control whereas they remain separate with speed vector control.

In addition, the top B is passed over horizontally whereas under speed vector control it is passed over with a slope, so with overshoot.

The drawback of this variant is that it requires a more tedious piloting with higher load factor differences.

Another advantsge of this variant is that it allows a stable servo control to be obtained by injecting a suitable and constant dose of the drift dH/dT of the difference $H-H_o$ (in fact $dH/dt=Vp$). On the other hand, in the case of the speed vector control solution, the servo control for the automatic pilot as a function of the difference $H-H_o$ requires a more delicate variable compensation.

In FIG. 7, a device is shown which may be used in the case of automatic ground tracking.

This device comprises an image correlator 1 for measuring the angular moving speed at each of the points of the considered zone of the image. This zone is defined by the values $\theta_1$, $\theta_2$ and by the values $\pm \Delta g$ in lateral deflection about the trajectory of the aircraft (shown with a broken line in FIG. 8) which is predicted from the angle of elevation of the aircraft and the load factor. The correlation is made by small limited elements of this zone, as shown in FIG. 8, and allows the elevational shift $\Delta(\theta - p)$ to be obtained or the shift along the vertical of the image, of any point of the zone explored between two successive times t and $t+\Delta t$, whence the angular moving speed $$\Omega = \frac{\Delta(\theta - p)}{\Delta t}$$

may be derived for all the points of the zone explored.

Since the object of the invention does not in itself relate to the correlator, and since this element is well known per se, particularly from French Pat. No. 1 504 656, it will not be described in greater detail here.

This correlation receives from the inertial guidance center 2 of the aircraft the data required for locating the different points of this image, namely the position of the horizon, the value of the incidence angle i of the aircraft, the value of slope p and the value of the angle of elevation of the aircraft (giving the vertical of the image)

The device shown in FIG. 7 also comprises processing means 3 for calculating at all points the difference with respect to the reference height: $\Delta h = V/\Omega \, sine^2 (\theta - p) - h_o$ from the values $\theta - p$ and $\Omega$ supplied by the correlator, V, supplied by the inertial guidance center 2 of the aircraft and $h_o$ supplied for example by a display means 4.

The processing means 3 comprise for that elementary circuits performing the elementary functions $X,:, -,$ sine, etc. and adapted so as to perform the desired function. The processing means 3 also allow the value $\Delta h_{min}$ to be detected, using known processing methods, from the set of values $\Delta h$ obtained for the different points of the zone explored.

The point corresponding to $\Delta h_{min}$ may be reinforced on the display. The values $\Delta h_{min}$ and g are delivered to the automatic pilot. The drift d/dt ($\Delta h$) is also supplied so as to allow loop stabilization; it is obtained for example from the calculation:

$$\frac{\Delta h(t + 2\Delta t) - \Delta h(t + \Delta t)}{\Delta t}$$

The device thus described corresponds to the case where the height h at which the different points on the ground are crossed is measured with reference to the direction of the speed vector.

The description corresponding to the case where the height H of crossing the different points on the ground is measured with reference to a horizontal passing through the center of gravity of the aircraft is derived from the preceding one by changing $sine^2(\theta - p)$ by sine $\theta$ sine $(\theta - p)$ and $(h, h_o)$ by $(H, H_o)$.

What is claimed is:

1. A method for assisting a height holding in air navigation for any point (M) of the image of the landscape flown over by an aircraft (A), located by its angle of elevation $(\theta - p)$ with respect to a speed vector (V) of the aircraft, and situated in a zone between a lower elevational limit $(\theta_1 - p)$ and an upper elevational limit $(\theta - p)$, in the path of the trajectory of the aircraft comprising the steps of:

detecting a difference between an angular speed ($\Omega$) of movement of this point with respect to the aircraft, depending on the height (h,H) at which this point is subsequently flown over by said aircraft, for identical piloting conditions, and a reference angular speed of movement ($\Omega_o$), corresponding to a reference height ($h_o, H_o$) of a subsequent crossing by said aircraft of a point having the same elevation $(\theta - p)$, for identical piloting conditions, and modifying the piloting of the aircraft, should a difference between these angular moving speeds be detected, so as to reduce these differences.

2. The method as claimed in claim 1, further comprising:

measuring the height (h) of subsequent point flown over by the aircraft by reference to the direction of the speed vector (V) of the aircraft;

modifying the piloting of the aircraft, by acting on the slope of its speed vector.

3. The method as claimed in claim 1 further comprising:

measuring the height (H) of subsequent flight over a point by the aircraft, by reference to a horizontal passing through the center of gravity of the aircraft;

modifying the piloting of the aircraft by acting on the height of the center of gravity of the aircraft with respect to the ground.

4. The method as claimed in claim 1 further comprising:

superimposing on an image, a moving scale corresponding to the reference height, each bar of which, corresponding to an elevational value between the lower limit and the upper limit considered, is driven at the angular reference speed of movement corresponding to this site.

5. The method as claimed in claim 1 further comprising:

defining for any point (M) of the zone considered by its angle of elevation $(\theta - p)$ with respect to the speed vector of the aircraft;

measuring from the image the angular speed $(\Omega)$ of movement of this point with respect to the aircraft, calculating the angular reference speed of movement $(\Omega_o)$ of the same point, from the reference height $(h_o, H_o)$, comparing these two values, for detecting a possible deviation.

6. The method as claimed in claim 5, wherein, after measurement of the angular speed $(\Omega)$, of movement of the point with respect to the aircraft calculating from this value $(\Omega)$ the height (h,H) of subsequent flight over this point by the aircraft, for identical piloting conditions, and;

wherein such detection comprises comparing directly the height (h,H) obtained at all points with the reference height $(h_o, H_o)$.

7. The method as claimed in claim 1, further comprising:

obtaining the values $(\Omega)$ or $\Omega_o$, from the values $h_o$ or $H_o$ or conversely, by applying the relationship:

$$\Omega = V/h \text{ sine}^2 (\theta - p)$$

or conversely:

$$h_o = V/\Omega \text{ sine}^2 (\theta - p).$$

8. The method as claimed in claim 1 further comprising:

obtaining, from values H or $H_o$, or inversely, by applying the relationship:

$$\Omega = V/H \text{ sine } \theta \text{ sine } (\theta - p)$$

or conversely:

$$H = V/\Omega \text{ sine } \theta \text{ sine } (\theta - p).$$

9. The method as claimed in claim 1 further comprising:

modifying the piloting of the aircraft so as to bring the smallest of the deviations (h-$H_o$, H-$H_o$, or $\Omega$-$\Omega_o$) detected in the zone considered back to zero.

10. A device for providing a piloting signal for an aircraft comprising:

means for measuring, from the image and for any point (M) of an image zone considered, defined by its angle of elevation $(\theta - p)$ with respect to a speed vector of the aircraft, the angular speed $(\Omega)$ of movement of this point with respect to the aircraft, means for calculating for each of these points, from a reference height, the angular reference speed of movement $\Omega_o$, means for comparing at all points the angular speeds $\Omega$ and $\Omega_o$, thus obtained and for producing said piloting signal based on the difference in said angular speeds.

11. A device for providing a piloting signal for aircraft as claimed in claim 10, further comprising:

means for measuring, from image and for any point of the image zone considered, defined by its angle of elevation $(\theta - p)$ with respect to the speed vector of the aircraft, the angular speed of movement of this point with respect to the aircraft, means for calculating, for each of these points, the height (h,H) of subsequent flights over this point by the aircraft, for identical piloting conditions, means for comparing at all points this height (h,H) with the reference height $(h_o, H_o)$.

12. The device as claimed in claim 10, wherein said means for measuring the angular speed of movement of each of the points consist of an image correlator.

* * * * *